US011259508B2

(12) United States Patent
Hellesøe et al.

(10) Patent No.: US 11,259,508 B2
(45) Date of Patent: Mar. 1, 2022

(54) FISH FARM

(71) Applicant: UNITECH Offshore AS, Blomsterdalen (NO)

(72) Inventors: Bernt Henrik Hellesøe, Bergen (NO); Gunnar William Birkeland, Haugesund (NO); Leiv Gunnar Wanvik, Nesøya (NO)

(73) Assignee: Unitech Offshore AS, Blomsterdalen (NO)

( * ) Notice: Subject to any disclaimer, the term of this patent is extended or adjusted under 35 U.S.C. 154(b) by 0 days.

(21) Appl. No.: 16/880,220

(22) Filed: May 21, 2020

(65) Prior Publication Data

US 2020/0281169 A1    Sep. 10, 2020

Related U.S. Application Data (63) Continuation of application No. PCT/NO2018/050288, filed on Nov. 21, 2018.

(30) Foreign Application Priority Data

Nov. 21, 2017   (NO) .................................. 20171877

(51) Int. Cl.
    *A01K 61/60* (2017.01)
    *A01K 61/10* (2017.01)
    *A01K 61/80* (2017.01)

(52) U.S. Cl.
    CPC .............. *A01K 61/60* (2017.01); *A01K 61/10* (2017.01); *A01K 61/80* (2017.01)

(58) Field of Classification Search
    CPC ........ A01K 61/60; A01K 61/10; A01K 61/54; A01K 61/75; A01K 71/00; Y02A 40/826;
(Continued)

(56) References Cited

U.S. PATENT DOCUMENTS 3,240,186 A * 3/1966 Dobell .................... A01K 61/60
    119/245
4,640,214 A * 2/1987 Bruns ...................... B63B 35/44
    114/258

(Continued)

FOREIGN PATENT DOCUMENTS

JP    S5442699 U    3/1979
NO    20161121 A1    10/2017
(Continued)

OTHER PUBLICATIONS

Alslak Berge, «Avslørte detaljer rundt Aquatraz», iLaks.no, Jun. 10, 2016, [Hentet May 24, 2018 fra internett], (https://ilaks.no/avslorte-detaljer-rundt-aquatraz/) Hele dokumentet.
(Continued)

*Primary Examiner* — David J Parsley
*Assistant Examiner* — Jeffrey R Larsen
(74) *Attorney, Agent, or Firm* — Conley Rose, P.C.

(57) ABSTRACT

A fish farm with a float ring, and a net fixed to the float ring. The float is flexible and is designed with an exterior walkway and interior room for personnel. At least one door or hatch provides access between the exterior walkway and the interior room for personnel.

20 Claims, 7 Drawing Sheets

(58) Field of Classification Search
CPC .............. Y02A 40/81; C02F 2103/20; C02F 2103/007; C02F 3/06; C02F 1/004; C02F 2301/046; C02F 2303/24; C02F 3/322
USPC .......................................... 119/223, 226, 215
See application file for complete search history.

(56) References Cited

U.S. PATENT DOCUMENTS

| | | | | |
|---|---|---|---|---|
| 4,837,989 | A * | 6/1989 | Levy ................... | A01K 63/003 52/27 |
| 5,967,086 | A * | 10/1999 | Knott, Sr. .............. | A01K 61/60 119/223 |
| 2006/0162667 | A1* | 7/2006 | Papadoyianis ......... | A01K 61/60 119/223 |
| 2010/0059046 | A1* | 3/2010 | Hinderling .............. | F24S 20/70 126/646 |
| 2010/0224136 | A1* | 9/2010 | Papadoyianis ......... | A01K 61/60 119/223 |
| 2013/0112151 | A1* | 5/2013 | Mizrachi ................ | A01K 61/60 119/223 |
| 2015/0000606 | A1* | 1/2015 | Angell ................... | A01K 61/13 119/223 |
| 2018/0160658 | A1* | 6/2018 | Lyngoy ................. | A01K 61/65 |

FOREIGN PATENT DOCUMENTS

| | | |
|---|---|---|
| NO | 20172017 A1 | 10/2017 |
| WO | 2015099540 A1 | 7/2015 |
| WO | 2018111111 A1 | 6/2018 |
| WO | 2018182427 A1 | 10/2018 |

OTHER PUBLICATIONS

Norwegian Search Report issued by the Norwegian Patent Office in relation to Norwegian Application 20171877 dated May 25, 2018 (2 pages).
International Search Report issued by the Nordic Patent Institute acting as the International Searching Authority in relation to International Application No. PCT/NO2018/050288 dated Feb. 7, 2019 (3 pages).
Written Opinion of the International Searching Authority issued by the Nordic Patent Institute acting as the International Searching Authority in relation to International Application No. PCT/NO2018/050288 dated Feb. 7, 2019 (4 pages).
European Patent Application No. 18881125.1 extended European search report dated Jul. 20, 2021 (8 pages).

* cited by examiner

FISH FARM

CROSS-REFERENCE TO RELATED APPLICATIONS

This application is a continuation of PCT International Application No. PCT/NO2018/050288 filed Nov. 21, 2018, which claims priority to Norwegian Patent Application No. 20171877, filed Nov. 21, 2017, the disclosure of each of these applications is expressly incorporated herein by reference in their entirety.

FIELD OF THE INVENTION

The present invention relates to a fish farm with a float ring and a net fixed to the float ring. The float is flexible and is designed with an exterior walkway and interior room for personnel. At least one door or hatch provides access between the exterior walkway and the inside room for personnel.

BACKGROUND OF THE INVENTION

Predictable and environmentally sustainable growth in Norwegian salmon- and trout farming is dependent on new areas being utilized in the outer coastal zone. This requires rethinking, robust and smart solutions. Sustainable also means that the growth in production cost per kg of produced salmon must be reduced or, to a greater extent, reversed.

The vast majority of fish farms in Norway are located inshore sheltered from waves, wind and currents. Fish farms today face several challenges in the fjords where they are located. Some of them are pollution of the seabed and salmon lice. These problems may be solved by moving the fish farms out to exposed sea areas with greater wave height, water depth and currents. The weather conditions in these sea areas are rough and one is therefore dependent on a structure that can handle such weather conditions. The operation of the fish farm is also dependent on energy. Such energy may be supplied via service vessels. Such vessels that operate in the fjords are not suitable for operation offshore due to waves and wind. There is thus a need for an energy source that can supply such facilities with energy over long periods in harsh weather conditions.

SUMMARY OF THE INVENTION

The invention relates to a fish farm, also referred to as a net cage or a facility. The invention may also comprise one or more fish farms connected to or close to each other, e.g. 6 facilities. The facility includes a net and typically has a circumference of approx. 200 meters. Each facility includes a main supporting structure in the form of a float ring. The float ring may accommodate all systems and provisions necessary for efficient and proper farming of salmon, including personnel, feeding systems and silos. Therefore, a feeding vessel is not necessary and the fish farm is thus one independent unit. The fish farm is adapted for harvesting of solar energy and allows for the establishment of an energy system for renewable energy in the outer coastal zone.

The fish farm is suitable for harsh weather conditions and includes a renewable energy system. The energy system can also be used on existing facilities, supply energy to one or more facilities or supply energy for other purposes.

The main structure of the aquaculture facility forms a ring shaped structure with a circular cross section of polyethylene (PE) with an internal diameter between 2 and 6 meters, mainly 3 meters, and especially 3.6 meters, where the structure may have a circular circumference between 180 and 220 meters. The main structure may be extruded into a continuous structure, or into several parts joined together. Various elements of extruded profiles, including elastic elements, are suitable for large PE bodies in high seas. The main structure may be equipped with sensors to monitor stress and deformations. Extruded structures may be optimized with regard to strength, flexibility and rigidity and thus be adapted to the various sea conditions and very rough sea.

The main structure provides shelter and room for crew, technical equipment, complete feeding system with silos and all necessary provisions. The main structure also makes it possible to carry an air-filled membrane or canvas structure with solar cells. The overlying membrane, which is extended with a skirt of 6 to 8 m depth, partially protects the fish farm from salmon lice in the upper water layers.

The energy system may include one or more of the following: solar cells, a remotely located solar cell facility, cables, batteries and control systems. The energy system can produce energy, including electricity, and store the electricity in batteries located on the facility or near the facility.

Depending on the size of the energy system, the aquaculture facility may have a significant excess of energy which may be used for the production of brackish water. The fish farm can also harvest energy from one or more wind turbines and/or one or more wave power facilities. These energy sources can produce compressed air that can operate both membrane filtration for low-salt water production, drive the feeding system without the use of pumps or compressors, and charge electric support vessels.

Exposed coastal areas are well-suited for harvesting nature's energy and forces, and the fish farm takes advantage of this primarily by producing electricity from solar energy, but also with the intention of harnessing wind and wave forces for production of both electricity and direct compressed air. The fish farm may be self-sufficient with energy and deliver excess energy to boats and other vessels that may be charged by a custom charging station/buoy.

The energy storage on the fish farm is planned as battery packs installed inside the main structure. Additionally, a battery container may be provided which may be stored on the seabed. The energy stored in these battery packs can supply energy both for the operation of the fish farm itself and for electric marine vessels via the charging station.

An alternative to the battery packs in the fish farms is to have a large battery container on a raft associated with the plant. In addition to the batteries, parts of the energy can also be stored as compressed air, so that it can be used in various operating processes, e.g. feeding and brackish water production.

A floating structure/barge may be used for the facility. This floating structure may be covered with solar cells on the upper side and it may be equipped with sensors to measure potential energy production using a linear wave power generator associated with the floating structure/barge.

A wave power generator can operate in connection with the fish farm. It is possible to install a waveguide to intensify the waves in a given area towards a wave power facility. An artificial waveguide can also be installed.

The wave power facility may function as follows: A buoy on the surface moves up and down with the waves. A steel wire is attached to the underside of the buoy at one end and to a linear generator at the other end. The generator is attached to a base on the seabed. The steel wire carries the buoy's movement to a translator in the electric generator, thus producing electrical energy. The generators produce an electric current of varying frequency and amplitude. Therefore, an underwater converter may be installed that converts the produced power to the standard 50/60 Hz AC power that may be used to power the fish farm. A facility can accommodate one or more generators, depending on the needs of the receiver and the capabilities of the location.

The fish farm includes a roof cover with solar cells. The solar cells may be melted/plastic welded/welded to the underlay. They do not need metal fasteners that are susceptible to damage by corrosion. The solar cells do not penetrate the underlay and thus the underlay remains completely waterproof, which is important in relation to lice problems. The solar cells are mainly of low weight compared to ordinary solar cells. The solar cells may also have snow melting capability. The top layer of reinforced glass is very resistant to wind and weather, including hail, but the solar cells are still very flexible, which is important when placed on a moving object such as this fish farm. The solar cells may be produced in irregular shapes, so that even more of the pie-shaped areas of the fish farms may be utilized.

Energy storage may be installed in the form of battery packs in the fish farm. The planned battery solution includes a battery pack integrated into the main structure of all the fish farms. These may be placed inside the PE tube which encircles the fish farms, where inverters, control systems, feeding equipment, etc. will also be placed. As an alternative to the battery packs in the fish farms, a larger battery container can be installed on a raft attached to the fish farm. In addition to this, a battery container may be placed on the seabed in the long term, which will serve as a charging station for AUVs (Autonomous Underwater Vehicles). Battery packs may be supplied which may be integrated in the PE tubes, a container for storage on the seabed and a container for storage on a raft.

In addition to batteries, a significant part of the energy from wind turbine and wave power facilities may be stored in the form of compressed air which can produce low-salt water. In the long term, it may be possible to replace air compressors and pumps completely with compressed air from self-supplied energy production without having to go about producing electricity.

Fresh water and brackish water are important measures against parasites. The fish farm is adapted for considerable energy production, which makes it possible to produce large amounts of low-salt water on the fish farm. From such energy facilities, compressed air may be stored which may be used to press the brine through membranes to produce low-salt water, for example 5-15 ppm low-salt water. This water may be over-saturated with oxygen and provide an oxygen-rich brackish water layer in the upper part of the fish farm, which can contribute to a more hostile environment for the lice. The fish farm can also include self-developed lice traps up and downstream of the fish farm.

In the outer and exposed coastal zone, where the wave height may be 4-8 m, there is a large number of unused sites with significantly better water exchange than what is often the case inside the fjords. Overall, the load will increase in exposed coastal zones, but this will still be a desired development as long as one chooses sites that give minimal local load. The facility can lie in the transition between fjord and sea.

The main structure can accommodate feeding systems that cause the feeding raft to become redundant, instead including its function within the main structure. The fish farm is adapted so that a service boat can be moored to the fish farm. The service boat may be a plug-in hybrid electric boat that may be charged from the fish farm and also by land based electricity when in port.

Waveguides may be used to divert the waves away from the fish farms and/or to concentrate the waves into a wave power facility.

Wind turbines may be used as part of or in connection with the facility.

The facility may include equipment such as feeding systems, net cages for dead fish, control systems, lighting above and below water, environment and camera surveillance and more. A lice trap may be included upstream and downstream of the fish farm.

A waveguide may be used to reduce the sea load on the fish farm and at the same time increase the amount of energy supplied to the wave power facility. Large lenses under the sea surface or on the bottom may be designed so that the wave front may be steered away from the fish farms and towards a wave power facility and increase the effect on the latter by up to 50%. The main structure can withstand high seas and provide shelter for fish farmers as well as ensuring that the fish are healthy, but it can also provide the necessary carrying capacity to carry a membrane that functions as a roof and as an underlay for solar cells.

The main structure is designed with space for ballast, floating elements, ventilation and sections for all necessary technical equipment. There are also planned simpler circular profiles in which the walkway is located inside.

The choice of material is mainly extruded Polyethylene (PE), preferably High Density Poly Ethylene (HDPE). The material is very strong and ductile in the elastic regimen and has the ability to return to its original shape after significant deformation. The Young's modulus and shear modulus are approx. 1/400 of steel, and because of this feature (low resistance to deformation) it can withstand and adapt to the forces of waves, wind and current as this results in small stress variations even though large deformations may be observed with the naked eye.

The fish farm is basically an independent unit and self-sufficient in energy and everything one needs to run efficient, sustainable and safe fish farming, but can also be supplied with energy from external sources.

The fish farm includes a roof cover. The roof cover helps to provide an area for solar cells, and contributes to provide an improved indoor working environment for operators. It also contributes to a more efficient feeding with dispersion without wind. In addition, it has aerodynamic properties. The roof cover, like the entire structure, is designed to collapse in a controlled manner in the event that waves washes over the roof cover. The roof cover is extremely compliant at the same time as it can withstand regular stress and strain limits. The roof cover can rise back to its normal position when the water is drained through peripheral slots and openings between roof segments.

The roof cover also allows for a controlled environment for fish farming, where, for example, lighting in the ceiling may be used to accelerate the daily frequency and growth of fish. The roof cover provides a better working environment as, together with the float ring, it creates an environment protected from precipitation, waves, wind and sea spray.

The roof cover and its integrity comes from, among other things, the acting cargo-carrying wire grid (suspension bridge principle), and air beams (air beams in the form of pressurized pillows mounted on the above-mentioned wire grid).

A support point has been introduced in the center of the fish farm. This makes it possible to reduce the arch height of the cable grid as well as reduce the volume and silhouette of the air beams, all in favor of a low wind profile as well as the flatness with regard to the efficiency of the solar panel system.

This support point is located on a floating element that floats in the sea surface. The floating element is attached to a mast that holds the roof cover up. The floating element has freedom of movement in the heave axis to reduce tension on the roof cover if water washes over the roof cover. The mast and the floating element are supported by the float ring via radially positioned rigid or non-rigid spokes or lines, including metal rods, ropes, wire, chain or the like, to avoid movement in the horizontal plane.

Frost and ice formed from spray or atmospheric mist may be combated by "turning" the energy from batteries back into solar cells, which will then melt frost and ice. Load from cable grid and canvas is relatively small in relation.

The roof structure that carries the solar cells is dimensioned for 30 metres per second H10 speed.

Wind may be a challenge with regard to dynamic effects. The roof cover therefore has a circular opening of approx. 5-15 m diameter in the top and slits of approx. 10-30 cm in all junctions. This is also important with regard to "air pumping" when large waves pass through the fish farm interior, which could have contributed to fatigue over time. The opening therefore acts as a valve that normalizes the air pressure below the roof cover relative to the ambient air pressure.

The fish farm may have the following characteristics:
The float ring is easily deformable at a level far from floating steel-based fish farms.
PE as the main material in the float ring (Young's Modulus 1/400 part of steel)
Synthetic membrane canvases in the roof cover with highly deformable and minimal hysteresis loss during stretching.
Multi modal collapse mechanisms and recovery without permanent damage or fatigue on canvas and solar cells
Coherent stiffness in all elements of the collapse chain that prevents tearing including connection to central floating element
No metallic components in the solar cells that would increase the risk of tearing due to "step up" of stiffness
No sharp corners and geometry on the solar cells that can lead to tension in the membrane and attachments Fresh water and brackish water have become an effective tool for lice treatment. As the roof cover represents a considerable area, this may be used to collect rainwater and store it in tanks (double bottom).

6 facilities will offer a significant rain-exposed area to collect fresh water and may be used to make brackish water.

The fish farm may also contain a production facility for low-salt water as an important tool against lice, driven by compressed air generated from wind turbine or wave turbine energy or by solar electricity.

The cross-section of the float ring may have a diameter of 3.6 meters and is highly suitable for supporting a yarn, and may also contain all the technical equipment necessary inside the tube. Tanks for fish food and other equipment can also be easily installed inside a large diameter tube. Large diameter tubes or profiles may be extruded in sizes ranging from 350 mm to 5000 mm in diameter.

The float may further comprise an inner floor located over a waterline.

The float ring structure may consist of a plurality of arched elements fixedly connected and interconnected with joint pieces. The joint pieces may form tight bulkheads between the arched elements.

The tight bulkheads between the arched elements may include doors or hatches which allow movement of personnel from the interior space of an arched element to the interior space of the adjacent arched element. Each arched element may be extruded in PE (polyethylene). Each arched element may have a substantially ring shaped cross-section. Each arched element may have a substantially D-shaped cross-section.

One or more of the internal compartments in the float ring may comprise a feeding system. Fish farms can further comprise a compressor for blowing fodder through hoses or tubes and out into the fish farm.

The float ring can define an inner area above the net and a solar cell cover can extend over this area at a distance from a sea surface within the fish farm. The solar cell cover may include a centrally located opening and a centrally located floating support member for the roof secured in the centrally located opening. The solar cell cover may be defined by a number of sector-shaped elements. The number of sector-shaped elements may correspond to the number of arched elements, and each arched element may include a fan for inflating channels in the solar cell cover.

The fish farm can further comprise batteries in the internal compartment of the float ring, the batteries being supplied with energy from solar cells on the solar cell cover. The batteries can provide energy to the feeding system.

DETAILED DESCRIPTION OF THE FIGURES

Figure 1:
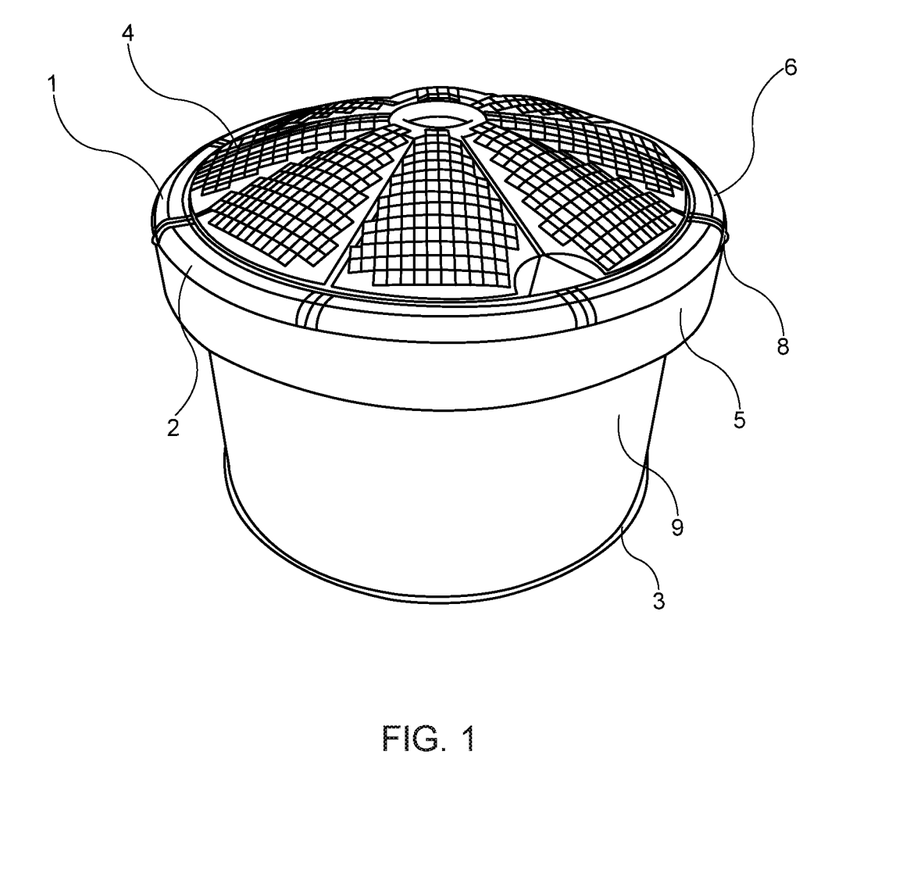
FIG. 1 is a perspective view of a fish farm according to the invention.

FIG. 1 shows a fish farm 1 with net cage and a float ring 2 according to the invention. The float ring 2 is divided into eight arched elements 6 connected to eight joint pieces 7. The joint pieces 7 have mooring fastening points 8. The joint pieces form bulkheads between the arched elements 6. A lice skirt 5 which is impervious to salmon lice and possibly other parasites is attached along the outer edge of the float ring 2. A net 9 is attached along the inner edge of the float ring 2. A ballast ring 3 keeps the net taut. The net 9 and ballast ring 3 may be of a standard type. A solar cell cover 4 is fixed in an upper part of the float ring 2. The solar cell cover 4 carries solar cells and may be self-supporting in between the float ring 2.

Figure 2:
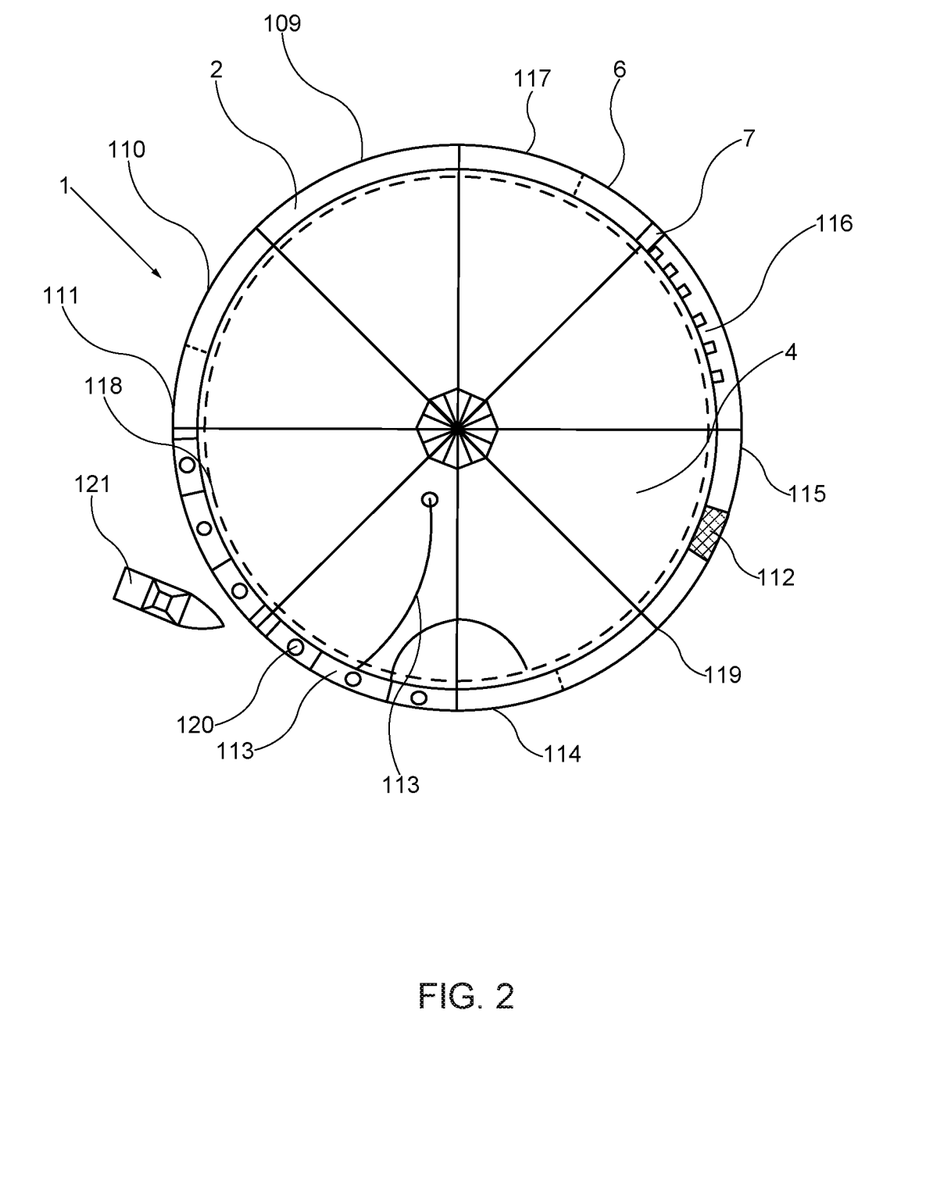
FIG. 2 is a top view of a fish farm according to the invention.

FIG. 2 shows the fish farm 1 with the float ring 2, eight joint pieces 7, eight arched elements 6 and a solar cell cover 4. The float ring 2 is dimensioned for internal stay of personnel and has a control room with a fuse box 109, a common room 110, room for rescue equipment 111, batteries 116 for storage of energy from the solar panels and possibly nearby wind turbines or wave power facilities, storage 115, loading and unloading elements 112, a feeding system 113, feeding system fans 114, noise-insulated room for emergency generator 117, eight bulkheads with doors 119 and walkway 118. A support vessel 121 may be electrically powered and may be charged via the batteries and solar cells or the other units that provide renewable energy. Hatches 120 provide access for personnel to the rooms in the float ring 2.

Figure 3:
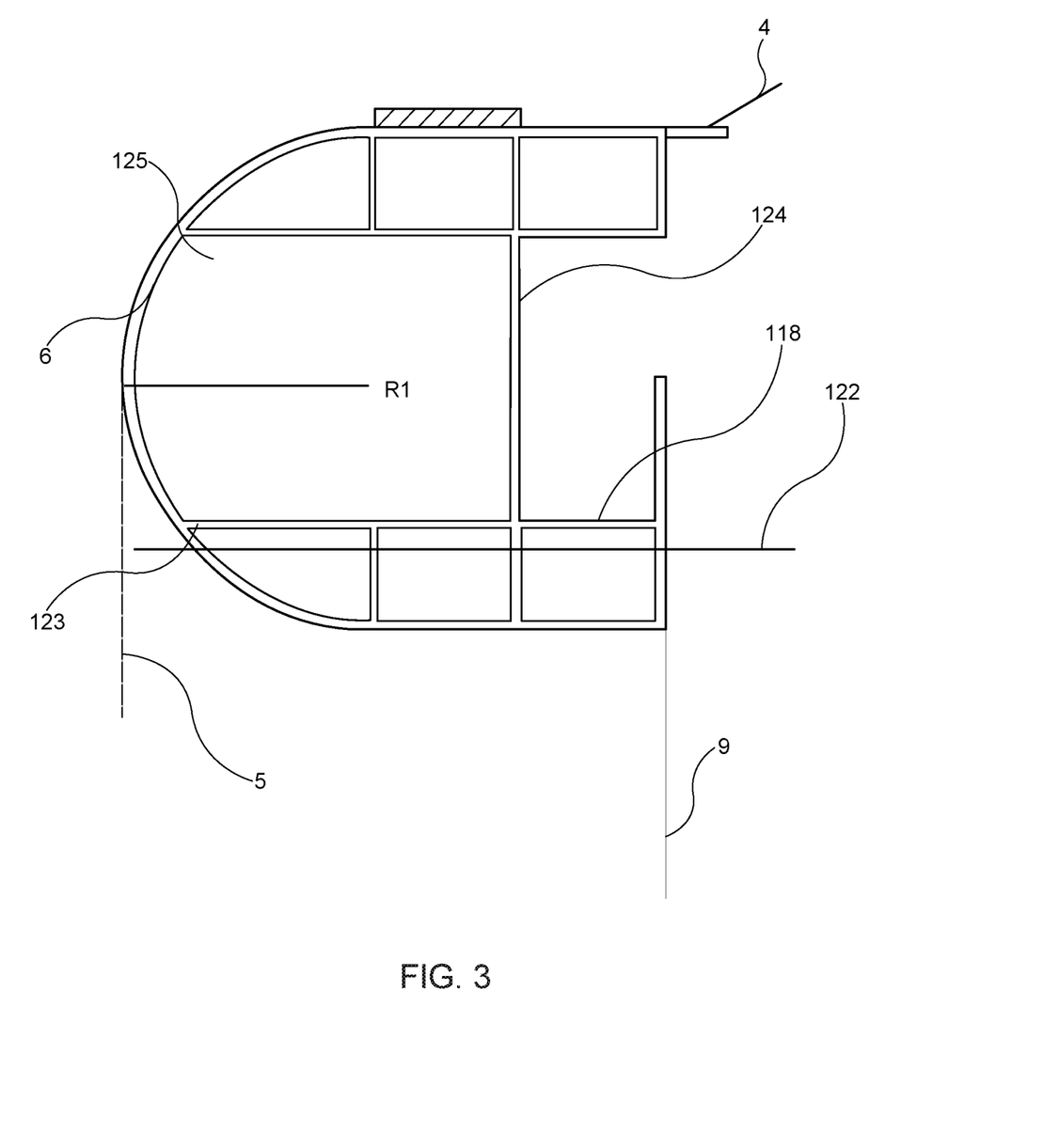
FIG. 3 is a cross-sectional view of a float ring in a first embodiment of the invention.

FIG. 3 shows a cross section of a first embodiment of the arched element 6 according to the invention. The arched element 6 is formed of extruded polyethylene PE and D-shaped with a radius R1 in the arch of 1.75 m. This radius provides good internal space so that it's easy for a person to stand upright while also providing room for equipment. There is also room for the floor to be placed above the waterline so that the floor may be made self-draining. Inside, a personnel room 125 is formed with a floor 123 and an inner wall 124 facing the center of the float ring defined by the arched elements 6. A walkway 118 is formed at the same level as the floor 123 but is located exteriorly as a hallway. The floor and walkway are covered by grids. The floor 123 and the walkway 118 are above a waterline 122, so that the floor 123 may be made self draining if water enters the personnel room 125. The lice skirt 5 is fastened along the outer side of the arched element 6 and the net 9 is fastened along the inner side of the arched element 6 against the center of the float ring. The solar cell cover 4 is secured in an upper edge of a roof of the arched element. Channels extend above and below the personnel room and may include cabling, air ducts, fodder channels, fresh air ducts, etc.

Figure 4:
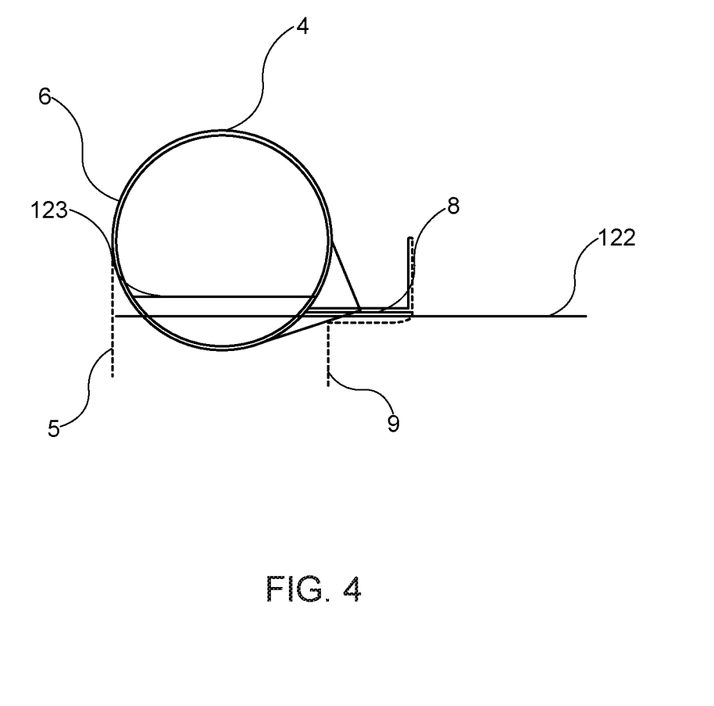
FIG. 4 is a cross-sectional view of a float ring in a second embodiment of the invention.

FIG. 4 corresponds to FIG. 3, but shows another embodiment with a circular cross section. The circle typically has a diameter of about 3 meters so that there is room for a person to stand upright, and so that there is plenty of room for equipment inside of the arched element. The arched element 6, with a circular cross-section, also comprises a floor 123 at a distance above a water line 122. As in FIG. 3, FIG. 4 also shows that the lice skirt 5 is fixed along the outer side of the arched element 6 and the net 9 is fixed along the inside of the arched element 6 towards the center of the float. In this embodiment, the walkway 118 lies on the exterior of the circular cross section. The solar cell cover 4 is attached to the top of the arched element 6.

Figure 5:
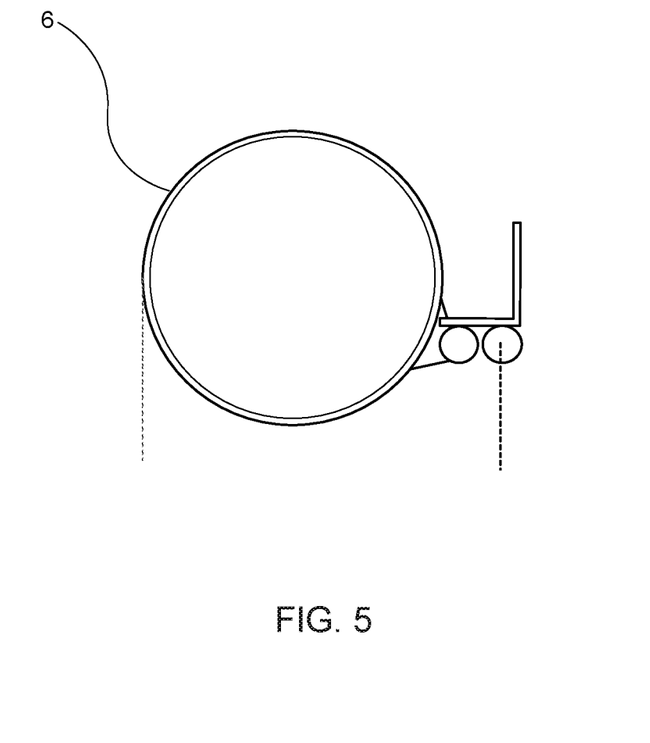
FIG. 5 is a cross-sectional view of a float ring in a third embodiment of the invention.

FIG. 5 corresponds to FIG. 4, but shows another embodiment of an arched element 6 of a circular cross-section. In this embodiment, the arched element is adapted to be used in combination with an existing net cage.

Figure 6:
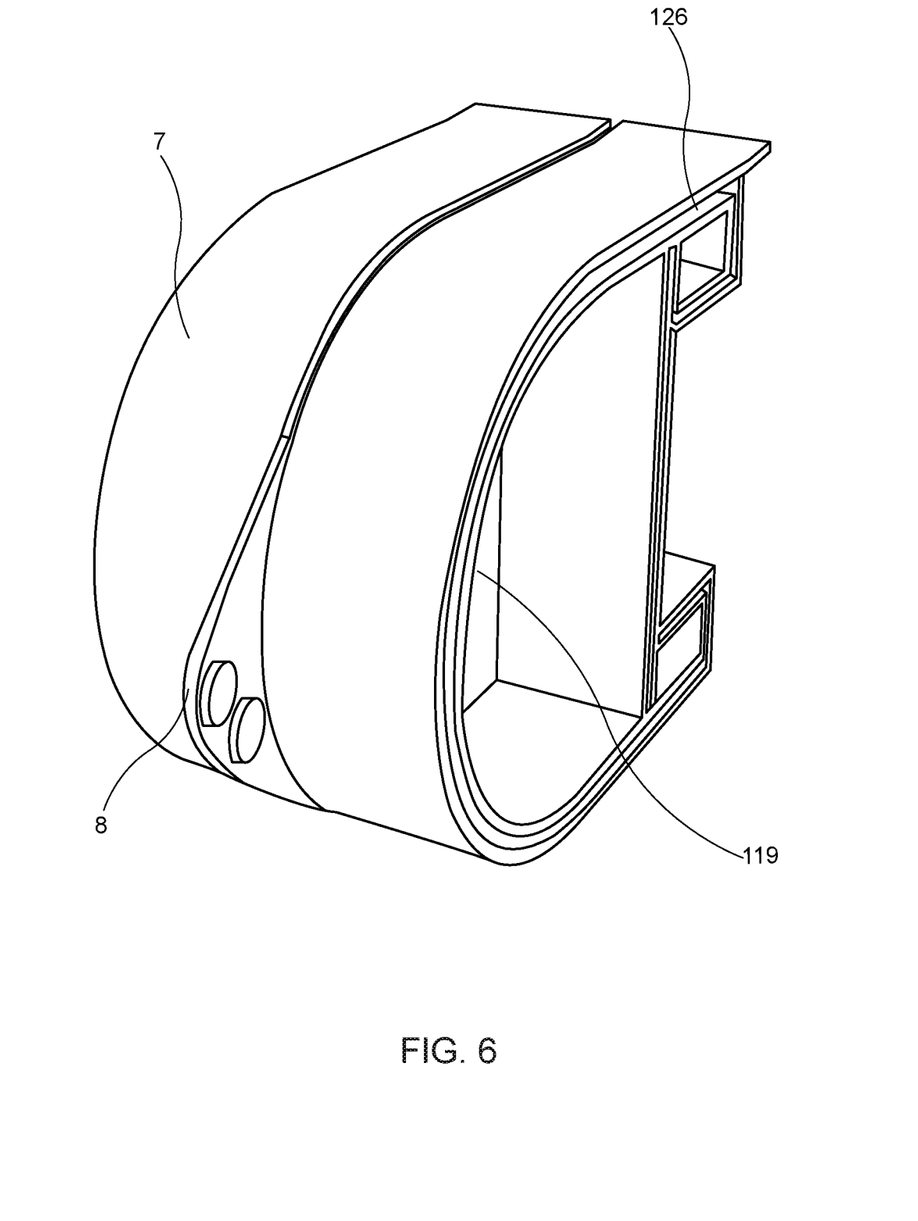
FIG. 6 is a perspective view of a joint element for a float ring in a first embodiment of the invention.

FIG. 6 shows a joint 7, typically made of glass fiber. The joint piece 7 comprises a mooring attachment for attaching the fish farm to a suitable anchorage or other arrangements. A bulkhead 119 with a door is located in the middle of the joint 7. A slot for an extruded arched element extends along the edge of the joint. The joint piece 7 is similarly formed on both sides of the bulkhead 119 so that an arched element may be inserted into the slot 126 for the arched elements at either side of the joint, and join two arched elements.

Figure 7:
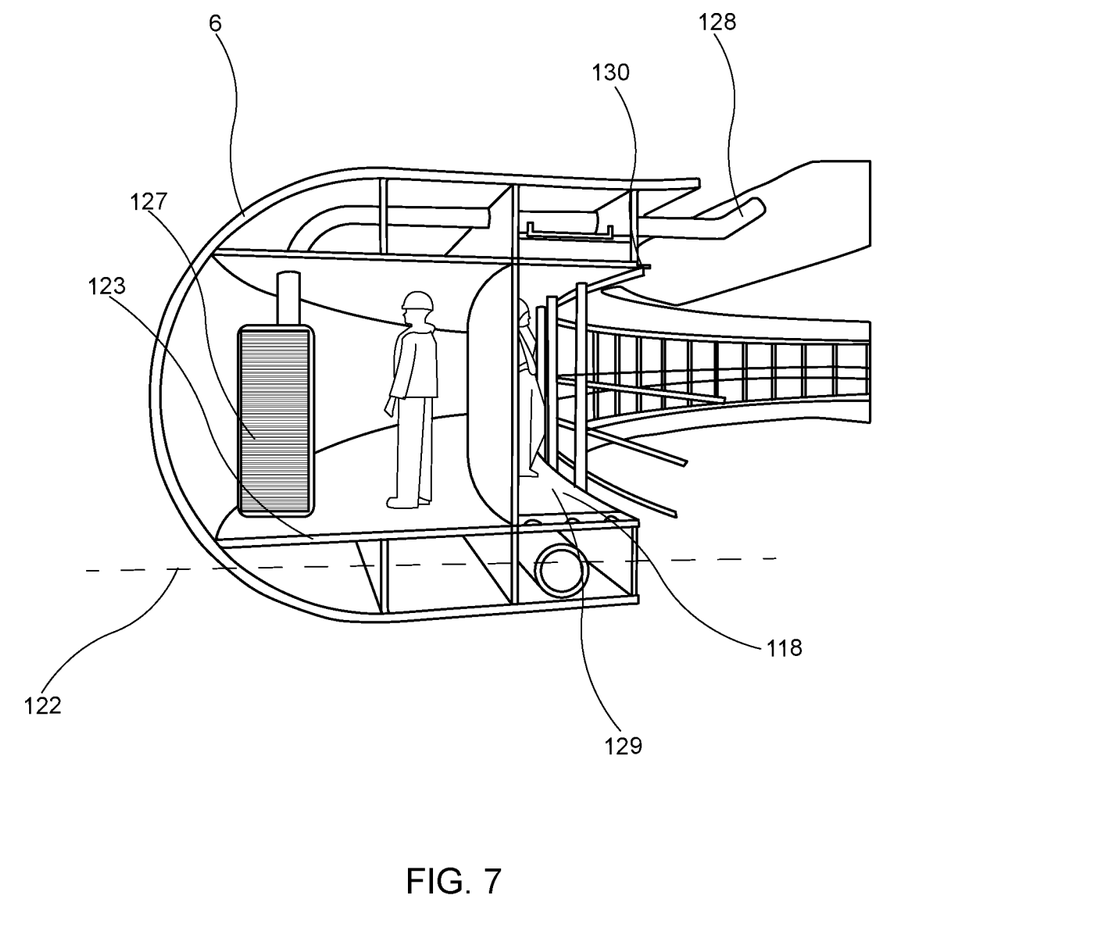
FIG. 7 is a sectional perspective view of a fish farm according to the invention.

FIG. 7 shows the same embodiment as FIG. 3, in addition to further details of the solution. FIG. 7 also clarifies the dimensioning and shows the personnel room/interior room for personnel. A fan/compressor 127 for injecting air into ducts in the solar cell cover is located on the floor 123. The floor 123 is located above the waterline 122. The fan/compressor 127 blows air through air ducts 128 to inflate the solar cell cover. Grids 129 extend along the floor 123 and walkway 118. Fastening for hoists 130 and the like extends along an upper part of the hallway surrounding the net. The fastening 130 is well away from the sea surface and this facilitates handling of the net as the net and other elements may be hoisted higher than the sea surface.

The float ring is extruded from PE and ensures that the float is flexible and so that the float ring can follow the movements in the water. In this way, large mechanical stresses are avoided as stress concentrations are avoided, and because the sea carries the entire ring even in rough sea.

As shown in the illustrated embodiments of the invention, there are eight arched elements and joint pieces, but other numbers of arched elements and joint pieces are also possible, e.g. five, six or seven. However, eight arched elements are suitable for a standard net cage size since the lengths of each arched element are then suitable for transport along the road.

| | |
|---|---|
| 1 | Fish farm |
| 2 | Float ring |
| 3 | Ballast ring |
| 4 | Solar cell cover |
| 5 | Lice skirt |
| 6 | Arched element |
| 7 | Joint piece |
| 8 | Mooring fastening point |
| 9 | Net |
| 109 | Control room with a fuse box |
| 110 | Common room |
| 111 | Rescue equipment |
| 112 | Loading and unloading elements |
| 113 | Feeding system |
| 114 | Feeding system fans |
| 115 | Storage |
| 116 | Batteries |
| 117 | Noise-insulated room for emergency generator |
| 118 | Walkway |
| 119 | Bulkhead with door |
| 120 | Hatch |
| 121 | Support vessel |
| 122 | Water line |
| 123 | Floor |
| 124 | Inner wall |
| 125 | Personnel room |
| 126 | Slot for arched element |
| 127 | Fan/compressor for inflating the solar cell cover |
| 128 | Air duct for roof cover |
| 129 | Grid |
| 130 | Fastening for hoists etc. |

The invention claimed is:

1. A fish farm comprising:
a float ring including an inner floor located over a waterline and an exterior walkway extending from an inner side of the float ring;
a net cage fixed to the inner side of the float ring such that the net cage extends downward from the walkway, the float ring being flexible, the float ring having an interior room for personnel, with at least one door or hatch giving access between the exterior walkway and the interior room for personnel, wherein the float ring is made up of a plurality of arched elements fixedly connected to each other by joint pieces, wherein each arched element has a substantially annular cross-section or a substantially D-shaped cross-section; and
a feeding system in the interior room of the float ring.

2. The fish farm according to claim 1, wherein each of the plurality of arched elements are inserted within slots formed in the joint pieces, and wherein the joint pieces each comprise a bulkhead.

3. The fish farm according to claim 2, wherein the interior room for personnel is defined in a first arched element of the plurality of arched elements, wherein the bulkheads between the arched elements comprise doors or hatches which allow the movement of personnel from the interior room for personnel of the first arched element to another interior room for personnel defined in a second arched element of the plurality of arched elements that is adjacent the first arched element.

4. The fish farm according to claim 1, wherein each arched element is extruded PE.

5. The fish farm according to claim 1, wherein the interior room for personnel is a plurality of discrete interior rooms for personnel, wherein one or more of the plurality of discrete interior rooms for personnel of the float ring comprise the feeding system.

6. The fish farm according to claim 5, further comprising a compressor for blowing fodder through hoses or tubes and out into the fish farm.

7. The fish farm according to claim 1, wherein the float ring defines an interior area above the net cage and wherein a solar cell cover extends over the interior area at a distance from a sea surface within the net cage.

8. The fish farm according to claim 7, wherein the solar cell cover comprises a centrally located opening and a centrally located floating support element for a roof fixed in the centrally located opening.

9. The fish farm according to claim 7, wherein the solar cell cover is formed of a plurality of sector-shaped elements.

10. The fish farm according to claim 9, wherein the number of sector-shaped elements correspond to the number of arched elements, and wherein each arched element comprises a fan for inflating channels in the solar cell cover.

11. The fish farm according to claim 7, further comprising batteries in the interior room for personnel of the float ring, the batteries being supplied with energy from solar cells on the solar cell cover.

12. The fish farm according to claim 11, wherein the batteries provide energy to a feeding system.

13. The fish farm according to claim 1, wherein the net cage is fastened along an inner side of the plurality of arched elements and extending downwardly therefrom.

14. The fish farm according to claim 13, further comprising a lice skirt fastened along an outer side of the plurality of arched elements and extending downwardly therefrom.

15. The fish farm according to claim 1, wherein each of the plurality of arched elements are inserted within slots formed in the joint pieces.

16. A fish farm comprising:
a float ring including an inner floor located over a waterline and an exterior walkway extending from an inner side of the float ring;
a net cage fixed to and extending downward from the inner side of the float ring, the float ring having an interior room for personnel, with at least one door or hatch giving access between the exterior walkway and the interior room for personnel; and
a lice skirt fixed to and extending downward from an outer side of the float ring;
wherein the float ring comprises a plurality of arched elements fixedly connected to each other by joint pieces, wherein each joint piece comprises a slot that receives a corresponding one of the plurality of arched elements therein; and
wherein each arched element has a substantially annular cross-section or a substantially D-shaped cross-section.

17. The fish farm according to claim 16, wherein each of the joint pieces comprises a bulkhead with a door.

18. The fish farm according to claim 17, wherein the float ring defines an interior area above the net cage and wherein a solar cell cover extends over the interior area at a distance from a sea surface within the net cage.

19. The fish farm according to claim 18, wherein the solar cell cover is formed of a plurality of sector-shaped elements.

20. A fish farm comprising:
a float ring including an inner floor located over a waterline and an exterior walkway extending from an inner side of the float ring;
a net cage fixed to the inner side of the float ring such that the net cage extends downward from the walkway, the float ring being flexible, the float ring having an interior room for personnel, with at least one door or hatch giving access between the exterior walkway and the interior room for personnel, wherein the float ring is made up of a plurality of arched elements fixedly connected to each other by joint pieces, wherein each arched element has a substantially annular cross-section or a substantially D-shaped cross-section; and
a feeding system in the interior room of the float ring, wherein each of the plurality of arched elements are inserted within slots formed in the joint pieces.

* * * * *